May 24, 1966   A. F. FRIEDEL   3,252,696
FLEXURAL PIVOT DEVICE
Filed Oct. 21, 1963
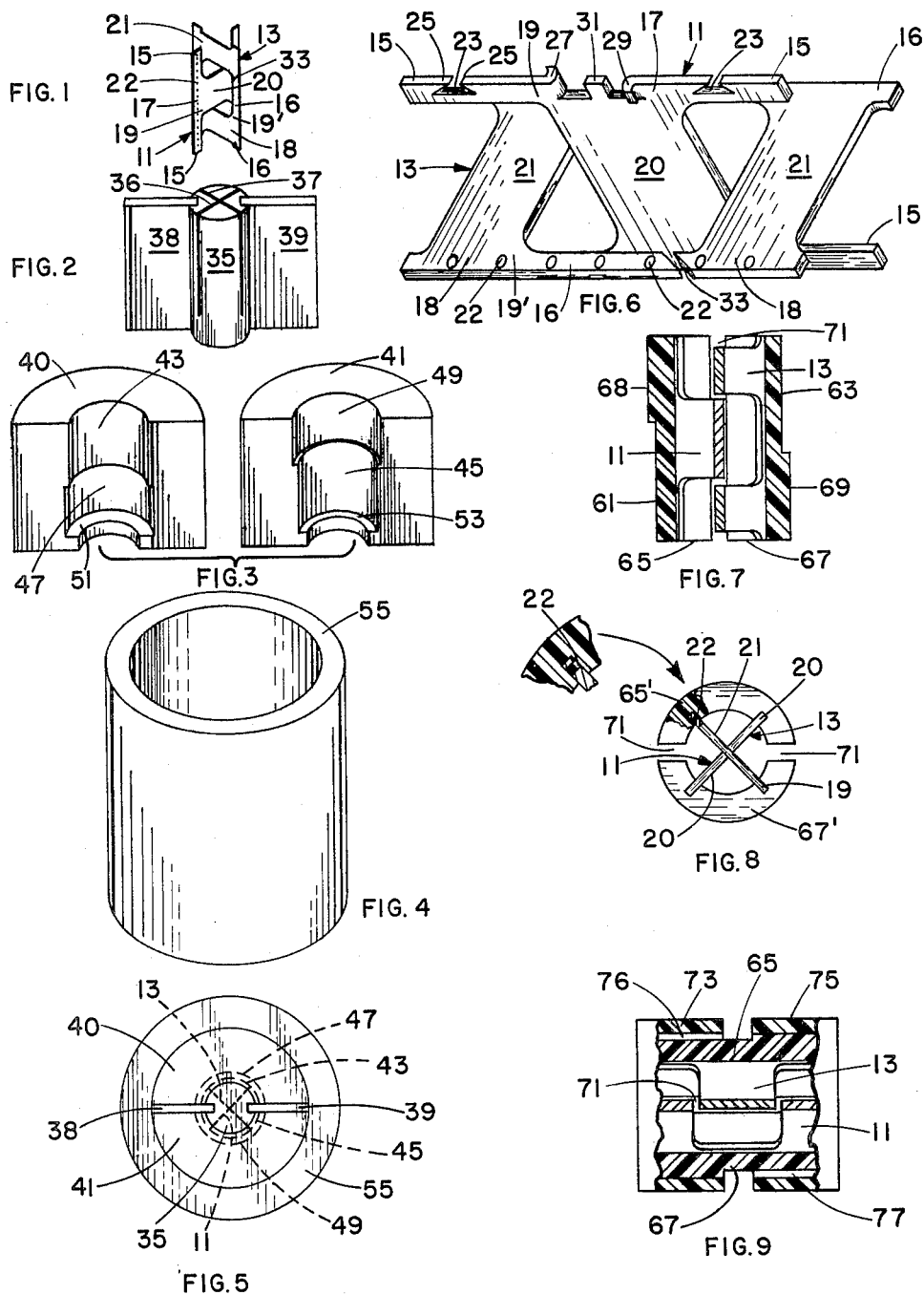
INVENTOR.
ANDREW F. FRIEDEL
BY Robert W. Ely
ATTORNEY

United States Patent Office 3,252,696
Patented May 24, 1966

3,252,696
FLEXURAL PIVOT DEVICE
Andrew F. Friedel, West Edmeston, N.Y., assignor to The Bendix Corporation, Utica, N.Y., a corporation of Delaware
Filed Oct. 21, 1963, Ser. No. 317,416
7 Claims. (Cl. 267—1)

This invention relates to flexural pivots and more particularly concerns new means and methods for making such pivots and the resulting pivots.

An object of this invention is to provide a method for more economically manufacturing flexural pivots which previously have been of all-metal construction and involved metal operations such as brazing and machining.

A further object is the provision of apparatus for uniting flat spring elements and low-melting-point material, such as a thermosetting plastic, to form flexural pivots.

Another object is to provide an improved flexural pivot which has crossed flat metal springs and connecting plastic members wherein a strong attachment between the metal springs and the connecting plastic members is achieved.

The realization of the above objects, along with the advantages and features of the invention will be apparent from the following description and the accompanying drawing in which:

FIGURE 1 is an isometric view of two flat spring elements arranged perpendicularly for insertion into a center mold device, FIGURE 2 is an isometric view of a center mold device and shows crossed-slots for springs and diametrical projections, FIGURE 3 is an isometric view of two outer core members adapted to encase the center core device and to abut the projections thereof, FIGURE 4 is an isometric view of a cylindrical outer mold adapted to encase the FIGURES 2 and 3 device and members, whereby suitable spaces for the addition or injection of a fluid plastic result, FIGURE 5 is a plane view of the bottom of the FIGURE 4 outer mold with the other members mounted therein, FIGURE 6 is an enlarged isometric view of the FIGURE 1 type of springs and shows the various edge formations of the springs to give good adhesion and strong attachment, FIGURE 7 is a cross-sectional side view of a reed-like flexural pivot or core assembly which results from adding or injecting plastic into the FIGURE 5 apparatus, FIGURE 8 is a plane end view of a reed-like flexural pivot which can be made with apparatus similar to what has been shown except for the omission of varied surface diameters, and FIGURE 9 is a cross-sectional, side view of a cantilever-type, flexural pivot which results from mounting sleeves on the FIGURE 7 core assembly.

Referring to FIGURES 1 and 6, a wide I-shaped, flat spring element 11 is shown arranged perpendicularly in respect to a similarly-thin, flat D-shaped spring element 13. Both elements 11 and 13 have longitudinally-extending projections 15 and 16 from the outer end or ends 17 and 18 of the transverse wide parts thereof to provide longitudinal edge extensions or end parts 19 and 19' from crossed flat, wide and narrow spring parts 20 and 21. These projections or edges have circular, drilled holes 22 (shown only in one extension 18 in FIGURE 1) or other formations, such as shown in FIGURE 6. The other formations may be recesses 23 with facing pointed projections 25 or two oppositely or reversely bent tabs 27 and 29 at each side of a radially-extending finger 31 extending outwardly from the wide flat spring part 20.

A narrow diagonal opening 33 permits spring 11 to be inserted into the opening of D-shaped spring 13.

In FIGURES 2–5, the cylindrical center mold rod or device 35 has two perpendicularly-arranged slots 36 and 37 extending to a bottom solid part and two plates or projections 38 and 39 extending radially and diametrically. Slots 36 and 37 are adapted to receive springs 11 and 13 so that their longitudinal extensions 18 and 19 extend beyond the cylindrical surface of center device or rod 35. The two, semi-circular encasing dies 40 and 41 of FIGURE 3 have diagonally-diametrical smaller diameter interior surfaces 43 and 45 and mounting interior surfaces 47 and 49.

Inwardly-projecting semi-circular flanges 51 and 53 are adapted to abut the bottom of center rod 35 below slots 36 and 37 to provide spaces thereabove. Both dies 40 and 41 are adapted to abut projections 38 and 39 to provide two varied-diametered arcuate spaces between opposite sides of projections 38 and 39. The sleeve 55 of FIGURE 4 encases semi-circular dies 40 and 41 and abuts the radially outer ends of projections 38 and 39 so that a complete mold for injection of a plastic or other low-melting-point material in the spaces and around the longitudinal extensions 18 and 19 having hold of part 20 of springs 11 and 13.

A thermosetting plastic which is eminently suitable is ACME #1–501–A reinforced with nylon fibers. This plastic is a diallyl phthalate supplied by the Acme Resin Corporation, Forest Park, Illinois, and compresses molds at 270–320° F.

It is to be noted that the tops of the springs 11 and 13 are flush at the top of rod 35 and that the side edges of the springs are spaced slightly from the smaller diametered-interior surfaces of the dies 40 and 41.

The mold assembly of FIGURE 5 shows the arrangement of springs 11 and 13, rod 35, dies 40 and 41, and steel sleeve 55 so that a molten material at a temperature below 350° F. (which is below the temperature at which heat-treated chrome stainless springs 11 and 13 made from AISI #420 are adversely affected) can be moved into the open spaces.

In FIGURE 7, the reed-type flexural pivot which results from the above-described molding method and apparatus is shown. It is to be noted that the smaller-diameter surfaces 61 and 63, arcuate plastic reeds 65 and 67 overlap at the center and result from overlapping of the smaller-diameter interior surface dies 40 and 41. The larger-diameter mounting surfaces 68 and 69 are adapted to receive sleeves and are shorter in length than reduced-diameter surfaces 61 and 63. Springs 11 and 13 are firmly attached to reeds 65 and 67 due to the holes (not appearing) which give good adhesion by extended surfaces and circular connecting plastic formations or structure extending through the holes. Similar strong mechanical attachment is given by the other formations shown in FIGURE 6. Travel limit spaces 71 result from projections 38 and 39.

In FIGURE 8, a reed-type flexural pivot without reduced diameter is shown, although the other proportions remain the same as the FIGURE 7 pivot remain. It is to be noted that the diameter of the center rod and inner surfaces of dies 40 and 41 are such as to give appreciable wall thickness to the reeds 65 and 67, even with reduced-diameter construction, for wall strength, adhesion to the springs, and strong attachment between springs 11 and 13 and reeds 65' and 67'.

In FIGURE 9, the cantilever type pivot which results by roughing the mounting surfaces with sandpaper to remove the glaze and cementing with epoxy resin two sleeves 73 and 75 on mounting surfaces 68 and 69 of the core assembly of FIGURE 7. Rotational clearance spaces 76 and 77 result. Due to the shorter length of mounting surfaces 68 and 69 and corresponding length of sleeves 73 and 75, it is clear that, if sleeve 73 is fixed in support structure and sleeve 75 has a limitedly-pivoted device attached, relative rotation is possible without rubbing at the facing ends of sleeves 73 and 75. Travel is limited by closing travel gaps 71. Those skilled in the art can readily appreciate that the double-end support type of flexural pivot taught in U.S. Patent 3,073,584, issued on January 15, 1963, inventor Henry Troeger, is within the scope of the present invention. Operation of both types of the pivots is more fully described in U.S. Patent No. 3,073,584, issued to Troeger on January 15, 1963.

It is apparent that the selection of the spring material will be determined by the conditions and requirements of the pivot application and whether or not the spring can withstand the heating effect of the molten material. A further consideration is whether or not the material of the connecting structure can withstand temperatures required to post-heat-treat the springs. The springs would usually be heat-treated before molding or casting.

Other materials which can be used for the crossed springs are: (1) beryllium copper which is non-magnetic and has a low modulus of elasticity, (2) phosphorous bronze, (3) other high strength stainless steels, (4) 18% nickel maraging steels which can be aged at 900° F., (5) Rene 41 which is high-temperature-operable and produced by General Electric, (6) Nispan C (International Nickel) which has a constant modulus of elasticity over a temperature range of minus 50° F. to 150° F. above zero, and (7) inexpensive straight carbon spring steel (AISI #1070 or #1090).

The material for the connecting structure can, in some instances, be alloys or metals having an aluminum base, a zinc base, or other die casting metals. Another plastic which is suitable with #420 steel is thermosetting Epiall #1288 having short glass fibers therein. Epiall is an epoxy resin obtained from Mesa Plastics Company, Los Angeles, California, and molds at 280–325° F. The plastic would be selected to give the required strength in tension and compression under conditions of use. The cement or bonding agent (epoxy, braze coating, flash-plate or the like) would likewise vary as to materials and the requirements and conditions of use.

It is to be noted that no machining or deburring is required and that the molding method and apparatus are inexpensive. These factors, plus the use of a moldable material, give a low cost flexural pivot.

It is to be understood that persons skilled in the art can make changes in the described articles, methods, and apparatus without departing from the invention as set forth in the following claims.

What is claimed is:

1. A flexural pivot device comprised of:
   first and second elongated means arranged symmetrically on a common axis,
   said first and second elongated means having axially-extending edges spaced from each other to provide two travel gaps,
   crossed flat spring means connecting said elongated means so that said first and second elongated means are rotatable relative to each other on said common axis,
   said crossed spring means having attachment means at the radially-outer ends, and
   said elongated means being formed of a molded material, said attachment means embedded in said molded means to oppose the movement of said springs.

2. The flexural pivot according to claim 1 and being further characterized by:
   said attachment means extending longitudinally and having holes and facing pointed projections.

3. The flexural pivot according to claim 2 and being further characterized by:
   said first and second elongated means being substantially similar arcuate members, said arcuate members being formed from a plastic material and said cross spring means being formed from spring steel.

4. A flexural pivot device comprised of:
   first and second cylindrical means arranged on a substantially common axis and axially spaced from each other,
   said first cylindrical means having an inwardly-projecting arcuate structure,
   said arcuate structure extending axially into said second cylindrical means and being radially-spaced therefrom,
   said second cylindrical means having inwardly-projecting arcuate structure diametrical of said arcuate structure of said first cylindrical means,
   said arcuate structure of said second cylindrical means extending axially into said first cylindrical means and being radially-spaced therefrom,
   said arcuate structures having axially-extending edges spaced from each other,
   crossed flat spring means connecting said arcuate structures so that said first and second cylindrical means are rotatable relative to each other on said common axis,
   said crossed spring means having longitudinally-extending attachment means at the radially-outer ends,
   said first and second cylindrical means formed of a molded material, and said attachment means molded in place in said molded material.

5. The flexural pivot according to claim 4 and being further characterized by:
   said attachment means including holes and reversely-bent circumferentially-projecting tabs.

6. The flexural pivot according to claim 1 and being further characterized by:
   said attachment means extending longitudinally and having holes and reversely-bent, circumferentially-projecting tabs.

7. The flexural pivot according to claim 4 being further characterized by:
   said first and second cylindrical means formed of a molded plastic material; and
   said attachment means molded in place in said plastic material.

References Cited by the Examiner

UNITED STATES PATENTS

| | | | |
|---|---|---|---|
| 2,339,434 | 1/1944 | Stehlik | 18—36 |
| 2,860,495 | 11/1958 | Stark | 64—11 |
| 2,931,066 | 4/1960 | Goettl | 264—242 |
| 2,951,695 | 9/1960 | Stone | 267—1 |
| 3,051,607 | 8/1962 | Werth | 264—242 |
| 3,070,844 | 1/1963 | Warnken | 18—36 |
| 3,073,584 | 1/1963 | Troeger | 267—1 |
| 3,124,873 | 3/1964 | Troeger | 267—1 |

FOREIGN PATENTS 1,133,268  11/1956  France.

ARTHUR L. LA POINT, *Primary Examiner.*

W. B. WILBER, *Assistant Examiner.*